(12) United States Patent
Valia

(10) Patent No.: US 7,685,253 B1
(45) Date of Patent: Mar. 23, 2010

(54) SYSTEM AND METHOD FOR DISCONNECTED OPERATION OF THIN-CLIENT APPLICATIONS

(75) Inventor: Rohit Valia, Redwood Shores, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1911 days.

(21) Appl. No.: 10/695,611

(22) Filed: Oct. 28, 2003

(51) Int. Cl.
*G06F 15/16* (2006.01)
(52) U.S. Cl. .................. 709/217; 709/203; 709/219
(58) Field of Classification Search ............. 709/203, 709/217–219
See application file for complete search history.

(56) References Cited

U.S. PATENT DOCUMENTS

| | | | |
|---|---|---|---|
| 5,832,218 A | | 11/1998 | Gibbs et al. |
| 6,332,163 B1 * | | 12/2001 | Bowman-Amuah ......... 709/231 |
| 2002/0065899 A1 * | | 5/2002 | Smith et al. .................. 709/214 |

OTHER PUBLICATIONS

Larry T. Chen, "AgentOS: The Agent-Based Distributed Operating System for Mobile Networks," ACM Crossroads Student Magazine, http/:www.acm.org/crossroads/xrds5-2/agentos.html, Jan. 29, 2001, (5 pages).
"Java™ 2 Platform, Enterprise Edition (J2EE™)," http//:javasun.com/i2EE/, Sep. 23, 2002, (4 pages).

* cited by examiner

*Primary Examiner*—Salad Abdullahi
*Assistant Examiner*—El Hadji M Sall
(74) *Attorney, Agent, or Firm*—Robert C Kowert; Meyertons, Hood, Kivlin, Kowert & Goetzel, P.C.

(57) ABSTRACT

System and method for disconnected operation of thin-client applications. In embodiments, a thin client on a client system may be used to access an application on a server via a network. Prior to the thin client disconnecting from the application, a version of the application including at least a portion of the application logic of the application may be downloaded to the client system to be accessed using the thin client during disconnected operation of the client system. After reconnection of the thin client to the application, changes made, if any, to application data on the client system may be integrated into the application data on the server.

37 Claims, 4 Drawing Sheets

SYSTEM AND METHOD FOR DISCONNECTED OPERATION OF THIN-CLIENT APPLICATIONS

BACKGROUND OF THE INVENTION

1. Field of the Invention

This invention relates to computer systems, and more particularly to disconnected operation of a thin client application when a client is not able to access the application server over a network.

2. Description of the Related Art

Applications are often implemented for access over a network. The vision of ubiquitous access to information continues to expand as more users rely on, for example, Internet-based applications. Ubiquitous access typically refers to the ability of users to access applications from virtually any network-connected computer at any time. A wide-area network such as an Internet may provide communication among computers as long as the computers are connected to the Internet. Examples of networked-based applications may range from stock trading applications to an employee paycheck tool. If a connection to the network ends, access to an application relying on the connection may also end.

Applications accessible over a network may become inaccessible at any time for various reasons. For example, a laptop operating a personal productivity tool via a network may be picked up and disconnected from the network. An existing network connection used by an application may suddenly disconnect because of a network cable failure or network traffic congestion, among other reasons. A massive network infrastructure such as the Internet may be subject to frequent shifts in configuration and network conditions. Numerous different computers may span multiple platforms and communication networks. Configuration volatility may be attributed to, for example, mobile computers (e.g., laptops, handheld devices) repeatedly connecting and disconnecting from the network. Reliability of the network tends to be unpredictable. Network failures are usually unexpected and may last for varying periods of time ranging from a few seconds to several hours or more.

As users gradually rely on the Internet as an indispensable tool, users may desire Internet-based applications to operate even though the applications or users may be occasionally disconnected from a network. The expectation is for productivity to continue even though a network connection is unavailable or not currently used. The application may be mission critical (e.g., users of the application may rely heavily on critical data maintained by the application and may expect the application to be highly available). The application may be a personal productivity application such as an expense reporting tool or a business-wide calendar and scheduling tool. Lack of network access may prevent or impede completion of an activity that relies on functionality provided by a network-based application. For example, completion of an employee expense report via a network-based application may be delayed until a network connection, and thus the network-based application, is available and used.

In network-based client/server applications, a thin client may be defined as a client that may be used to access one or more applications remotely and that does not include the bulk of the application's logic. In other words, a thin client typically serves as an interface to application logic of one or more remote applications, but typically includes little if any actual executable application logic of the remote applications, and thus typically performs little or no business processing of the application(s). Thus, a thin client typically performs little or no processing of the application(s) it accesses. The remote applications, typically on servers, provide the application logic that executes on behalf of the thin client, typically in response to user interaction with the thin client.

A thin client may, for example, include a Web browser that displays Web pages received from a Web and/or application server. A Web page may include a small client application (e.g., an embedded applet) of the application that executes within the Web browser. The majority or all of the functionality of the application (e.g., querying databases, executing complex business rules, connecting to backend systems, etc.) may be performed the application logic executing on a server where security, speed, services, reliability, etc. of server-side technologies may be leveraged.

In network-based client/server applications, a fat client may be defined as a client that may be used to access an application or server remotely. A fat client typically includes a significant amount of application logic, and, unlike a thin client, may perform most or all of the processing of the application(s) it accesses. For example, many e-mail applications are typically fat clients. A fat client may communicate directly with application logic of one or more applications (typically server-based applications), for example using Remote Method Invocation (RMI) or other protocols.

Note that, in practice, clients in network-based client/server applications may fall in an essentially continuous range from thin clients that provide only an interface to an application to fat clients that perform most or all of the processing of an application.

A thin client application may be defined as an application where the application logic is primarily provided for one or more thin clients by a remote application. In this client/server architecture, most of the application processing is done in the (fat) server. For example, a thin client may supply a graphical interface, while the application includes the application logic and provides application processing according to user interaction with the application via the thin client interface. Advantages of a thin client application may include, but are not limited to, simpler hardware (hardware to support the thin clients does not have to be able to support much if any application logic and processing) and simpler maintenance (most or all maintenance for the application is done on the server).

SUMMARY

Embodiments of a system and method for disconnected operation of thin-client applications are described. An application may be hosted on a server. A thin client may access the application from a client system coupled to the server via a network. A user of the client system may use the thin client to access the application on the server to remotely perform one or more functions of the application. The client system may be physically disconnected from the network for one of various reasons. Alternatively, the thin client may logically disconnect or "log off" from the application, even though the client system remains physically connected to the network.

In one embodiment, prior to disconnecting from the network, a version of the application may be downloaded to the client system. The downloaded version of the application may be configured to provide at least a portion of the functionality of the application to the thin client while the thin client is disconnected from the application. In one embodiment, the thin client may initiate the download. In one embodiment, the download may be initiated by the application. In one embodiment, only the application logic of the application that is necessary or desired during disconnected operation may be downloaded to the client system.

A user of the client system may use the thin client to access the downloaded version of the application on the client system to perform one or more functions of the application provided by the downloaded version while the thin client is disconnected from the application. During disconnected operation, downloaded data may be modified and/or new data may be generated on the client system. In one embodiment, any changes made during disconnected operation may be saved for processing and integration into the application on the server when and if the thin client reconnects to the application. In one embodiment, the downloaded version of the application may generate scripts, commands or other mechanisms for performing one or more functions of the application (e.g. modifying application data) when and if connection to the application is reestablished.

At some point, connection between the thin client and the application on the server may be reestablished. After reconnection, any changes made during disconnected operation may be integrated into the application on the server. One embodiment may include a synchronization service to which the changed data and/or mechanisms for modifying application data or performing other functions of the application may be provided; the synchronization service may then process and integrate the changes into application data and/or process and perform the tasks specified by the mechanisms (scripts, commands, etc) as necessary. In one embodiment, the application may directly receive the changed data and/or mechanisms for modifying application data or performing other functions of the application and process and integrate the changed data into the application data and/or process and perform the tasks specified by the mechanisms as necessary.

In one embodiment, changes made to application data during disconnected operation may be integrated into application data on the server in batch mode. In this embodiment, all changes made to application data during disconnected operation may be queued on the client system until reconnection, at which time the changes may be batch processed by the application or a synchronization service. During batch processing, the changes made during disconnected operation may be integrated into application data on the server.

In one embodiment, when downloading a version of the application to the client system, state information for the thin client with the application may be saved. In one embodiment, upon reconnection of the thin client to the application, the saved state information of the thin client may be used to reestablish and synchronize the state of the thin client with the application. In one embodiment, the downloaded version of the application may maintain and update state information on the client system during disconnected operations. Upon reconnection, the state information on the client system may be compared to saved state information for the thin client on the server to determine any changes that need to be made in state information on the server.

Figure 1:
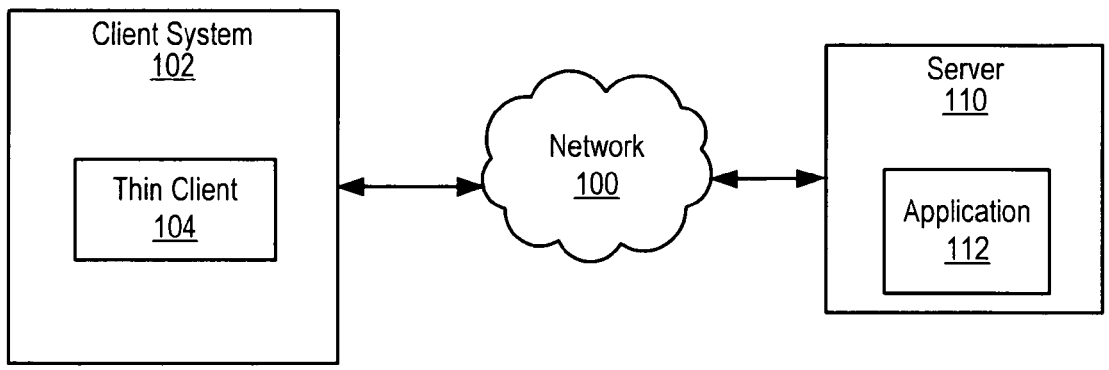
FIG. 1 illustrates a thin client application according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a system and method for disconnected operation of thin-client applications are described. In embodiments, a thin client may be used on a client system to access one or more applications installed on servers via a network. The client system may physically disconnect from the network, or alternatively the thin client may be logically disconnected from the application(s). Prior to disconnecting, at least a portion of the application code (i.e., application logic) of the application(s) may be downloaded to the client system to be accessed using the thin client in disconnected operation of the client system. At some point, the client system may be physically reconnected to the network and/or the thin client may be logically reconnected to the application(s). After reconnection, changes made, if any, to application data may be integrated into the application data on the server system(s).

A downloaded version of an application may be configured to provide at least a portion of the functionality of the application to the thin client while the thin client is disconnected from the application. A user of the client system may access the downloaded version of the application on the client system using the thin client to access one or more functions of the application provided by the downloaded version while the thin client is disconnected from the application. In one embodiment, any changes made during disconnected operation may be saved for processing and integration into the application on the server when and if the thin client reconnects to the application. At some point, connection between the thin client and the application on the server may be reestablished. After reconnection, any changes made during disconnected operation may be integrated into the application on the server.

As an example of disconnected operation, a version of an application including at least a portion of the application logic of the application may be downloaded to a notebook computer accessing the application using a thin client prior to disconnecting the notebook from the network so that a user of the notebook computer may continue accessing one or more functions of the application provided by the downloaded version of the application on the notebook while disconnected from the network. After reconnection, any changes made during disconnected operation may be integrated into the application on the server.

FIG. 1 illustrates a thin client application according to one embodiment. Application 112 may be a thin client application based on client-server architecture, N-tier architecture, or other network architectures. As an example, application 112 may be based on a three-tier architecture that includes a middle tier of one or more Web servers and/or application servers. One or more thin clients 104 may be configured to access application logic (i.e., the application code) of application 112 over a network 100. Each thin client 104 may execute on a client system 102, and application 112 may primarily execute, for example, on a server 110. In one embodiment, thin client 104 may not include any application logic of application 112. For example, thin client 104 may only include a graphical interface to application 112, while application 112 includes all of the application logic. In some embodiments, thin client 104 may include a portion of the application logic of application 112. For example, thin client 104 may include an interface to application 112 and a small portion of application logic to be performed on client system 102, while application 112 includes the majority of the application logic.

In one embodiment, network 100 may be a global network such as an Internet. A World Wide Web (WWW) may be used to access information communicated over the Internet. In one embodiment, network 100 may be a client/server-based network where one or more computers are configured as servers for one or more clients on the network. In this embodiment, each computer may function as a server, a client, or in some cases both. In some embodiments, network 100 may include or may be a Local Area Network (LAN) or Wide Area Network (WAN). Network 100 may be configured in a bus, star, ring or some other network topology or even a combination of topologies. Network 100 may include wired, wireless, or a combination of wired and wireless communications. Network 100 may support communication protocols including one or more of, but not limited to, TCP/IP (Transmission Control Protocol/Internet Protocol), Next Generation Internet (NGI), Hyper Text Transfer Protocol (HTTP), ICMP (Internet Control Messages Protocol), and/or Simple Mail Transfer Protocol (SMTP), among others.

Note that, in one embodiment, one or more systems on network 100 may be configured to participate as peer nodes in a peer-to-peer network environment on network 100. In one embodiment, the one or more systems may be configured to participate as peer nodes according to a peer-to-peer platform, for example Sun's JXTA platform. For example, thin client 104 and application 112 may be implemented on peer nodes in a peer-to-peer network environment on network 100. Thus, thin client 104 and application 112 may be thought of as components of a thin client peer-to-peer application in this embodiment.

Application 112 may be, for example, a personal productivity application such as a time and activity tracking tool or an expense-reporting tool, a mission critical application such as a stock trading system or an airline reservation system, or a distributed enterprise application operating across different computers based on different platforms and architectures. In general, application 112 may be any thin client application configured to be accessed over a network.

Application 112 may be accessed over the network 100 from various types of client systems 102. For example, client system 102 may be a laptop, hand-held computer, PDA, pocket personal computer or any other mobile computing device configured to connect to the network 100. Client system 102 may also be a personal computer, a desktop computer, or any other type of device connected to the network 100 and capable of supporting a thin client 104.

Thin client 104 and/or client system 102 may disconnect from application 112 and/or network 100 for any of various reasons. The thin client 104 may lose access to the application 112 accidentally or deliberately. For example, client system 102 may be a portable computer (e.g., laptop, hand-held device) accessing an application 112 (e.g. a personal productivity tool) via a thin client 104 (e.g. a browser) on client system 102, and client system 102 may be intentionally disconnected from application 112 and/or network 100. For example, a user accessing application 112 via a thin client on a laptop may disconnect the laptop from network 100. As another example, a network connection may "drop" due to a network hardware or software failure or network traffic congestion, among other reasons. As yet another example, server 110 may fail, and thin clients 104 of application 112 may thus be unable to access application 112. As still yet another example, a network connection used by client system 102 may disconnect at a scheduled shutdown time. Note that notification of the scheduled network shutdown (e.g., a shutdown time and a specific network area to be affected) may be forwarded to users of the network 100. In one embodiment, the disconnection may be logical rather than physical; for example, thin client 102 may logically disconnect from application 112 by ending a session with or "logging off" of application 112.

Figure 2:
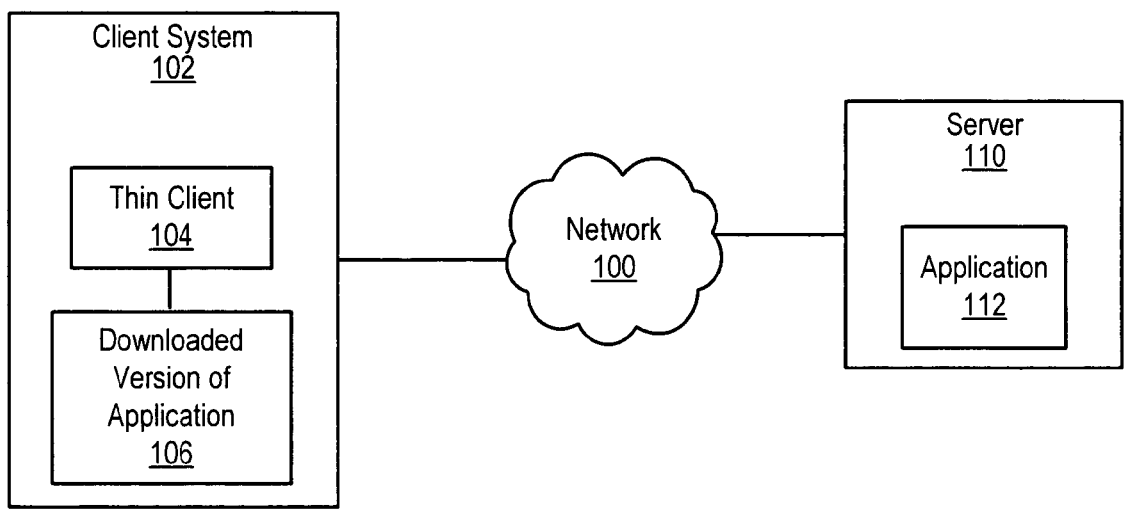
FIG. 2 illustrates a downloaded version of a thin client application accessible by a thin client on a client system according to one embodiment.

In one embodiment, prior to disconnecting from network 100 and/or application 112, a version of the application 112 may be downloaded to client system 102. FIG. 2 illustrates a downloaded version of a thin client application accessible by a thin client on a client system according to one embodiment. The downloaded version 106 of application 112 may be configured to provide at least a portion of the functionality of application 112 to thin client 104 while thin client 104 is disconnected from application 112. In one embodiment, the downloaded version of the application 106 may be stored in a particular location (e.g., specific directory, cache area, etc) and/or format (e.g., binary code, Java™ bytecode, etc) on client system 102.

In embodiments, downloading a version 106 of application 112 to the client system 102 may be initiated in various ways. In one embodiment, thin client 104 may initiate the download. In one embodiment, the download may be initiated by application 112. For example, server 110 may notify application 112 and/or client system 102 of an impending shutdown. In response to the notification, application 112 may automatically initiate the download of a version 106 of application 112 to the client system 102 before the shutdown. As another example, a network connection used by client system 102 may be scheduled to disconnect at some time, and thin client 104 may initiate the download of a version 106 of application 112 to the client system 102 before the scheduled network disconnect. In some embodiments, application 112 may be configured to automatically notify one or more thin clients 104 currently accessing the remote application that access to the application may or will be disrupted for some reason, and each thin client 104 may initiate a download of a version 106 of the application 112 to its client system 102 if the thin client desires or requires to continue accessing one or more functions of application 112 while application 112 is not available. As yet another example, a user of thin client 104 may desire to disconnect client system 102 from application 112 and/or network 100, and may initiate a download of a version 106 to continue accessing one or more functions of application 112 while client system 102 is disconnected, if desired.

Figure 3:
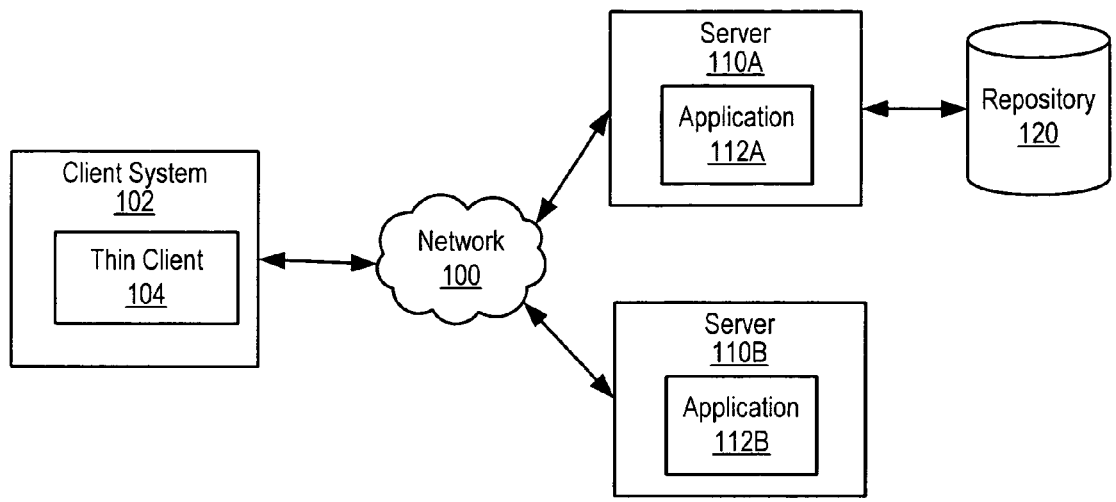
FIG. 3 illustrates a server with a central repository for application logic of an application that may be downloaded to client systems according to one embodiment.

In one embodiment, application logic of an application may be stored in a central repository on a server. FIG. 3 illustrates a server with a central repository for application logic of an application that may be downloaded to client systems according to one embodiment. In this embodiment, downloading a version of the application 112A on server 110A may include obtaining the application logic that is to be downloaded to a client system 102 from central repository 120 coupled to server 110A and downloading the application logic to the client system 102. In one embodiment, central repository 120 may include application logic for a plurality of different applications 112 hosted by the server 110A and/or other servers, and a version of two or more of the applications may be downloaded prior to a disconnect. In one embodiment, central repository 120 may include two or more different downloadable versions of an application 112, and one of the different downloadable versions may be selected to be downloaded based upon the capabilities and/or functionality needs of the client system to which the version is to be downloaded.

Note that FIG. 3 also illustrates two servers 110A and 110B each hosting different applications 112A and 112B, respectively, which client system 102 may access via network 100 using thin client 104. In one embodiment, there may be two or more different thin clients on client system 102 for accessing different applications. In one embodiment, a central repository 120 for application logic of an application (e.g. application 112B) may reside on a different system (e.g. server 110A) than a server hosting the application (e.g. server 110B), and may be accessed from the different system to be downloaded to client system(s) or alternatively downloaded directly from the different system.

Returning to FIG. 2, in one embodiment, a downloaded version of an application 106 may include only a portion of the application logic of application 112. For example, functionality of application 112 that supports network connectivity of client systems is preferably not included in downloaded version 106. As another example, logic for directly accessing databases or other applications on server 110 or other servers on network 100 may not be included in downloaded version 106. Note that client system 102 may be virtually any type of system with a digital heartbeat, and therefore may not have the hardware and/or software capabilities to support certain functionality of application 112; therefore, downloaded version 106 preferably does not include application logic that client system 102 may not be able to or cannot support. In general, downloaded version 106 preferably includes only the necessary application logic to support desired or required functionality of application 112 on client system 102 while disconnected from application 112. In other words, downloaded version is preferably as "thin" as possible while including application logic to support the desired or required functionality. In one embodiment, different versions of application 112 may be available to download to different client systems 102 based on the capabilities of the particular client systems and/or the desired or required functionality of application 112 to be supported during disconnected operation of thin client 104. In one embodiment, a user of client system 102 may be allowed to select from a set of functionalities of application 112 to be supported during disconnected operation of thin client 104, and only the application logic of application 112 necessary to support the selected set of functionalities may be downloaded to client system 102 in downloaded version 106.

In some embodiments, one or more access control mechanisms may be used to control (allow or deny) the downloading of versions 106 of application 112 by client systems 102. In one embodiment, a download of a version 106 of the application 112 may be allowed or denied based on a host name (e.g., network identifier) and/or host address (e.g., IP address) of the client system 102 requesting the download. In one embodiment, authentication and authorization may be used to determine if version 106 of application 112 may be downloaded to a client system 102. For example, a username and a password may be requested to verify an identity of a user, and the username and password may be checked against a particular group of users to determine if the user is authorized to download a version 106 of application 112. In one embodiment, the downloading of particular functionalities of application 112 may be controlled; in other words, a client system 102 may be allowed or denied the downloading of certain functionalities of application 112 based on one or more access control methods. In this embodiment, one client system 102 or user of the client system 112 may be allowed to download a limited version 106 of application 112 that does not allow the user to perform certain functions, while another client system 102 or user of the client system may be allowed to download a more robust version 106 of application 112 that allows the user to perform one or more of the functions not allowed to the user of the limited version. As an example, a manager may use a manager account and password to download a manager's version of application 112, and a normal employ may use an employee account and password to download an employee's version of application 112.

In some embodiments, application 112 may examine hardware and/or software configuration information for a client system 102 to determine if a version 106 of application 112 can execute on, and thus can be downloaded to, client system 102, and/or to determine what functionalities of application 112 are supported by the hardware and/or software of client system 102, and thus what application logic is to be downloaded to client system 102. In one embodiment, two or more different downloadable versions of application 112 may be maintained on server 100 that each support a different client system configuration, and application 112 may examine hardware and/or software configuration information for the client system 102 to determine the particular version of application 112 to download to the client system 102.

In one embodiment, when downloading a version of an application 112 to a client system 102 and disconnecting from the application 112 for disconnected operation of thin client 104, state information for a thin client 104 with application 112 may be saved. In one embodiment, the saved state information may be used upon reconnection of thin client 104 with application 112 to reestablish and synchronize the state of thin client 104 with application 112. A thin client 104 accessing an application 112 may involve many interactions, network connections, etc. between the thin client 104 and application 112. A state for a thin client 104 may include information and/or data related to the thin client 104 operations of application 112 such as a list of selected items for purchase, a set of user options, accessed files or other data, or other information and/or data that is associated with the particular thin client 104's interaction with application 112.

Depending on the application 112, state information may be maintained for the entire application 112, for one or more clients (fat or thin clients) accessing the application 112, and/or for one or more application components (e.g., beans, Web pages, modules, etc.). Depending on application 112, state information may be stored in memory, in a file on a storage device such as a disk, in a database, or in some other location. In one embodiment, a state for each thin client 104 may be maintained by application 112. Saving a state may be preferable, for example, because some protocols such as HTTP are stateless protocols that do not automatically indicate whether a sequence of requests is from the same thin client 104. In one embodiment, the state for thin client 104 with application 112 may be saved on server 110 hosting the instance of application 112. In another embodiment, the state for thin client 104 with application 112 may be downloaded to and saved on client system 102. Other embodiments may use other methods and/or locations to save the state for thin client 104.

In one embodiment, in addition to downloading a version of application 112 for disconnected operation to client system 102, application data desired or needed for disconnected operation using downloaded version of the application 106 may also be downloaded to client system 102. This downloaded data may include any files (configuration files, user files, documents, etc), databases or portions of databases, active data from application memory, etc.

After downloading a version of the application 106, thin client 104 may access the downloaded version of the application 106 via thin client 104 while client system 102 is disconnected from application 112 and/or network 100 to perform one or more functions of application 112 supported by the downloaded version on client system 102. Disconnected operation of one or more functions of application 112 via the downloaded version 106 may allow activities provided by the one or more functions of application 112 to be performed on client system 102 even though thin client 104 is unable to access application 112 over network 100. Note that some functionality of application 112 may not be available during disconnected operation; for example, functions that may require access to current data from application 112 and/or functions that may require access to data stored prior to disconnecting may not be available because of lack of access to application 112 and/or server 110. Note that, in one embodiment, the application logic of application 112 required to perform functions that cannot be performed during disconnected operation may not be included in downloaded version 106.

After disconnection, at some point connection between thin client 104 and application 112 may be reestablished. For example, if the disconnection was physical (e.g. client system 102 was physically disconnected from network 100) client system 102 may be reconnected to network 100 (at the same physical and/or logical location or at some other physical and/or logical location), allowing thin client 104 access to application 112 via the network. After physical reconnection, thin client 104 may logically reconnect to application 112 over network 100. In one embodiment, thin client 104 may resume a session with application 112 that was opened prior to the physical disconnection, or alternatively may establish a new session with application 112. As another example, if the disconnection was logical (e.g. thin client 104 ended a session with application 112), a new session may be established with application 112 by thin client 104 (e.g. by "logging on" to application 112).

In embodiments, resumption of connection to client system 102 and/or thin client 104 may be detected by and/or communicated to the application 112. In one embodiment, upon reconnection, thin client 104 may notify application 112 that it is reconnected and desires to resume an existing session or start a new session with application 112. In one embodiment, application 112 may detect reconnection of client system 102 to network 100. In one embodiment, to detect reconnection, network communication software and/or hardware of server 110 may repeatedly attempt to logically reconnect with client system 102 and, upon successful reconnection, notify application 112 that a logical connection with client system 102 has been reestablished. In one embodiment, application 112 may repeatedly attempt to logically reconnect with thin client 104 on client system 102 and thus detect when client system 102 reconnects to network 100. Other embodiments may use other mechanisms to detect and/or communicate reconnection of client system 102 and thin client 104.

During disconnected operation using downloaded version of the application 106, downloaded data may be modified and/or new data may be generated on client system 102. In one embodiment, downloaded version of the application 106 may generate scripts, commands or other mechanisms for performing functions of application 112 (e.g. modifying application data) when and if connection to application 112 is reestablished. After reconnection, changed (modified or new) data, if any, need to be processed and integrated into application data. In one embodiment, generated scripts, commands or other mechanisms for performing functions of application 112 (including, but not limited to, modifying application data), if any, need to be processed and performed.

In one embodiment, after reconnection of thin client 104 to application 112, changes made (e.g., modified or new data), if any, to downloaded application data during disconnected operation using thin client 104 and downloaded version of the application 106 may be submitted by thin client 104 for processing and/or integration into application data. In one embodiment, any commands, scripts, or other mechanisms for modifying application data or performing other functions of application 112 after reconnection may be submitted by thin client 104 for processing and performing. "Application data" may include any files (configuration files, user files, documents, etc), databases, application memory, etc in which application 112 stores and maintains data. "Processing" may include one or more of, but is not limited to: converting data created or modified by downloaded version of the application 106 into a format used by application 112 if necessary; performing mathematical, logical, editing, or other operations specified by commands, scripts, etc generated using downloaded version of the application 106; etc. "Integration" may include one or more of, but is not limited to: modifying application data to reflect changed data and/or in response to commands, scripts, etc. generated by downloaded version of the application 106; appending or adding new data to application data; modifying user information or configuration information of application 112; etc.

One embodiment may include a synchronization service or utility to which the changed data and/or mechanisms for modifying application data or performing other functions of application 112 may be provided; the synchronization service may then process and integrate the changes into application data and/or process and perform the mechanisms as necessary. In one embodiment, application 112 may directly receive the changed data and/or mechanisms for modifying application data or performing other functions of application 112 and process and integrate the changed data into the application data and/or process and perform the mechanisms as necessary.

In one embodiment, changes made to application data during disconnected operation on a client system 102 may be integrated into application data on server 110 in batch mode. In this embodiment, all changes made to application data during disconnected operation may be queued on client system 102 until reconnection, at which time the changes may be batch processed by application 112 or a synchronization service. During batch processing, the changes made during disconnected operation may be integrated into application data on server 110 as if the changes were being made during "normal" connected operation of application 112.

As previously mentioned, in one embodiment, when downloading a version of an application 112 to a client system 102, state information for a thin client 104 with application 112 may be saved. This state information may include any data (e.g. files, database tables, settings, etc) used by thin client 104 and/or application 112 during interactions between thin client 104 and application 112. In one embodiment, upon reconnection of thin client 104 with application 112, the saved state information may be used to reestablish and synchronize the state of the thin client 104 with application 112. In one embodiment, downloaded version 106 may maintain and update state information on client system 102 during disconnected operations. Upon reconnection, the state information 102 on client system 102 may be compared to saved state information for thin client 104 on server 110 to determine any changes that need to be made in state information on server 110.

In one embodiment, changes made to the state of the application 112 using the downloaded version 106 since a given timestamp (e.g., timestamp of disconnection) may be submitted to the application 112 or a synchronization service configured to process and integrate the changes into application 112. In one embodiment, a log of changes indexed by timestamp may be read by a synchronization service configured to process and integrate the logged changes into application 112. In one embodiment, the synchronization service may optimize the processing and integration of logged changes where possible. For example, a file that is first created and then later deleted may automatically be deleted from the logged changes before the logged changes are integrated into application 112.

In one embodiment, two or more thin clients 104 may perform disconnected operations on the same application data. In one embodiment, application 112 or a synchronization service may be configured to resolve conflicts in changes submitted for processing and integration into application 112 by two or more thin clients. For example, application 112 or a synchronization service may determine that more than one thin client 104 modified the same data during disconnected operation (e.g., for a calendar application, each user entered an appointment into a calendar for the same day and time, or for a text editing application, two or more users made changes to the same document). In one embodiment, changed data from disconnected operation of two or more thin clients 104 may be compared and analyzed to determine which version of changed data is to be integrated into application 112, or if changes from two or more of the thin clients 104 are to be integrated into application 112. In one embodiment, a version of data from one of the thin clients 104 may be automatically selected based on an assumption that the version of data may later be corrected, for example, by a user. In one embodiment, changes from two or more thin clients 104 may be integrated into application 112 in chronological order determined by timestamps associated with the changes. In one embodiment, a thin client 104 from which conflicting changes are to be preferably integrated may be chosen based on some ordering, ranking, or other aspect of the thin clients 104; for example, changes submitted by a manager may be preferably integrated over changes submitted by some other employee, or changes submitted by a primary author may be preferably integrated over changes submitted by a secondary author. In one embodiment, one or more of the users of thin clients 104 that submit conflicting changes may be notified of the conflicting changes, and may be asked to select which of the conflicting changes are to be integrated. Some embodiments may use a combination of methods to resolve conflicting changes. Note that one skilled in the art will recognize that there are other methods that may be used in different embodiments to resolve conflicting changes.

In one embodiment, once changes have been successfully integrated into application 112, downloaded version 106 may be automatically removed from client system 102. For example, downloaded version 106 may be deleted from a storage device such as disk. In another embodiment, downloaded version 106 may not be deleted but instead may be maintained for future potential disconnected operation. In one embodiment, a user of thin client 104 may be given the option to keep or delete downloaded version 106. In one embodiment, state information and/or data for the downloaded version 106 may be archived in case the state information and/or data is later needed. In another embodiment, the state information and/or data may be deleted.

In one embodiment, if downloaded version 106 is not deleted from client system 102, the downloaded version 106 may be checked to see if it is current with the version of application 112 on server 110 before future disconnected operation. If downloaded version 106 is not current (i.e. application 112 has been updated or replaced with a newer version but downloaded version 106 has not), downloaded version 106 may be updated on client system 102 or alternatively a new version may be downloaded to client system 102 to replace the old downloaded version.

Figure 4:
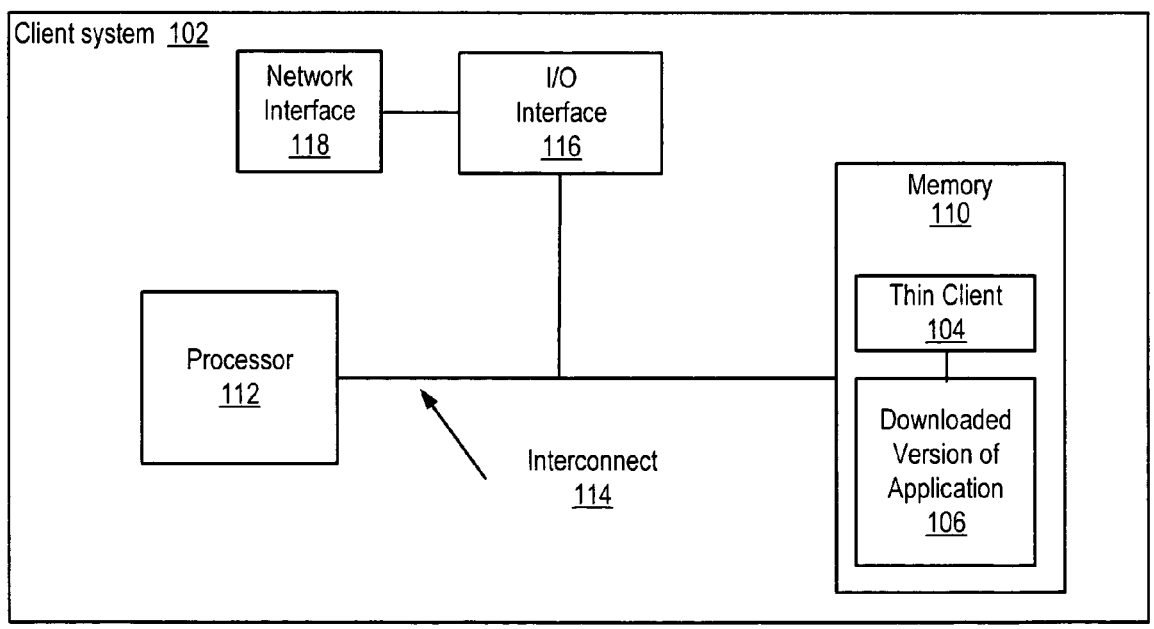
FIG. 4 illustrates a system including a downloaded version of an application for disconnected operation according to one embodiment.

FIG. 4 illustrates a system (client system) including a downloaded version of an application for disconnected operation according to one embodiment. System 102 may be any of various types of devices, including, but not limited to, handheld computing device, cell phone, network appliance, network computer, Internet appliance, personal digital assistant (PDA), embedded device, smart phone a personal computer system, desktop computer, laptop or notebook computer, mainframe computer system, workstation, or other suitable device. System 102 may include at least one processor 112. The processor 112 may be coupled to a memory 110. Memory 110 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. System 102 may couple over a network to one or more other devices via one or more wired or wireless network interfaces.

System 102 may also include components such as a device interconnect 114, an input/output (I/O) interface 116, and a network interface 118. Processor 112 may acquire instructions and/or data through the I/O interface 116. Interconnect 114 may be used to communicate data and instructions from one component to another. Interconnect 114 may be a point-to-point interconnect, a shared bus, a combination of point-to-point interconnects and one or more buses, and/or a bus hierarchy including a system bus, CPU bus, memory bus and input/output buses such as a peripheral component interconnect (PCI) bus. System 102 may be attached to a network as part of a distributed computing environment via network interface 118. System 102 may include additional and/or other components than those shown in FIG. 4, such as other processors and internal or external I/O devices including, but not limited to, displays, cursor control devices, keyboards, printers and scanners.

System 102 may include, in memory 110, a thin client 104 and a downloaded version of application 106. System 102 may be physically disconnected from a network for one of various reasons. Alternatively, thin client 104 may logically disconnect or "log off" from the application, even though the client system remains physically connected to the network. Prior to disconnecting from the network, a version of an application (hosted on a another system external to system 102 and to which system 102 is configured to couple via network interface 118) may be downloaded to system 102 as downloaded version of application 106.

Downloaded version of the application 106 may be configured to provide at least a portion of the functionality of the application to thin client 104 while thin client 104 is disconnected from the application. A user of system 102 may access the downloaded version of the application 106 on system 102 using thin client 104 to access one or more functions of the application provided by the downloaded version while thin client 104 is disconnected from the application. In one embodiment, any changes made during disconnected operation may be saved for processing and integration into the application on the server when and if thin client 104 reconnects to the application. At some point, connection between thin client 104 and the application on the server may be to reestablished. After reconnection, any changes made during disconnected operation of system 102 may be integrated into the application on the server.

Figure 5:
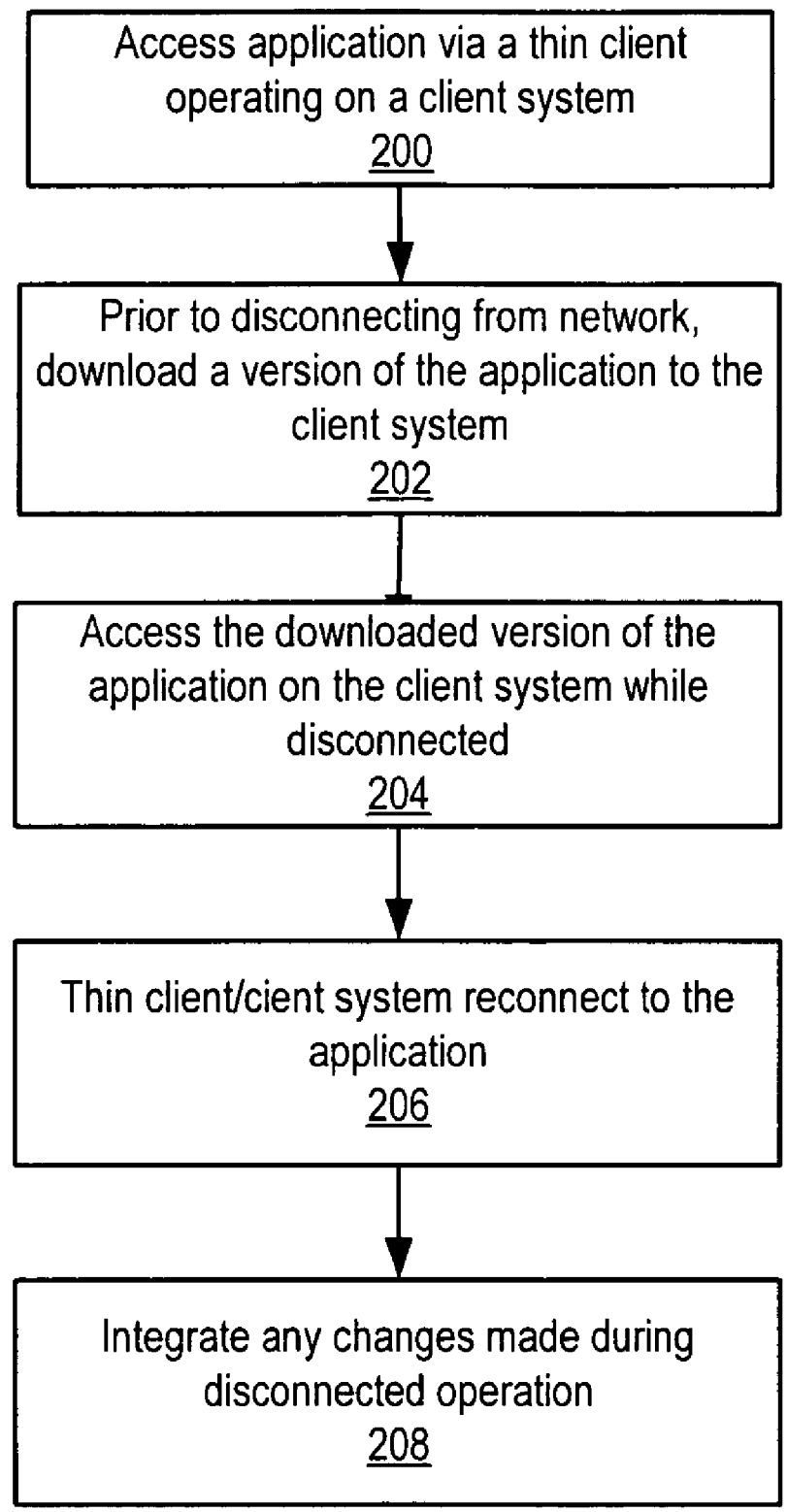
FIG. 5 is a flowchart of a method for disconnected operation of an application by a thin client according to one embodiment.

FIG. 5 is a flowchart of a method for disconnected operation of an application by a thin client according to one embodiment. An application may be hosted on a server. As indicated at 200, a thin client may access the application from a client system coupled to the server via a network. The client system may be any type of user device capable of network communications and capable of hosting the thin client. In one embodiment, the thin client and client system may include little if any of the actual application (business) logic of the application; the bulk, if not all, of the application logic may reside on the server, and the bulk of application processing may thus be performed by the application on the server. A user of the client system may use the thin client to access the application on the server to remotely perform one or more functions of the application.

The client system may be physically disconnected from the network for one of various reasons. For example, the client system may be a portable device (e.g. a laptop or PDA) that may be manually disconnected from the network or, if using wireless communications that may be moved out of range of a base station coupled to the network. As another example, the network connection may be scheduled to be taken down for maintenance or other reasons, or may go down due to hardware or software failure. Alternatively, the thin client may logically disconnect or "log off" from the application, even though the client system remains physically connected to the network.

As indicated at 202, prior to disconnecting from the network, a version of the application may be downloaded to the client system. The downloaded version of the application may be configured to provide at least a portion of the functionality of the application to the thin client while the thin client is disconnected from the application. In one embodiment, the thin client may initiate the download. In one embodiment, the download may be initiated by the application. In one embodiment, only the application logic of the application that is necessary or desired during disconnected operation may be downloaded to the client system. In one embodiment, downloading a version of the application may include saving state information for the thin client with the application. In one embodiment, required or desired data (e.g. files, database tables, etc.) for disconnected operations may be downloaded to the client system.

As indicated at 204, a user of the client system may use the thin client to access the downloaded version of the application on the client system to perform one or more functions of the application provided by the downloaded version while the thin client is disconnected from the application. In one embodiment, any changes made during disconnected operation may be saved for processing and integration into the application on the server when and if the thin client reconnects to the application.

As indicated at 206, at some point connection between the thin client and the application on the server may be reestablished. If the disconnection was physical (e.g. the client system was physically disconnected from the network) the client system may be reconnected to the network, allowing the thin client to access the application. After physical reconnection, the thin client may logically reconnect to the application. If the disconnection was logical (e.g. the thin client ended a session with the application), a new session may be established with the application by the thin client.

As indicated at 208, after reconnection, any changes made during disconnected operation may be integrated into the application on the server. During disconnected operation, downloaded data may be modified and/or new data may be generated on the client system. In one embodiment, the downloaded version of the application may generate scripts, commands or other mechanisms for performing one or more functions of the application (e.g. modifying application data) when and if connection to the application is reestablished.

One embodiment may include a synchronization service to which the changed data and/or mechanisms for modifying application data or performing other functions of the application may be provided; the synchronization service may then process and integrate the changes into application data and/or process and perform the tasks specified by the mechanisms (scripts, commands, etc) as necessary. In one embodiment, the application may directly receive the changed data and/or mechanisms for modifying application data or performing other functions of the application and process and integrate the changed data into the application data and/or process and perform the tasks specified by the mechanisms as necessary.

In one embodiment, changes made to application data during disconnected operation may be integrated into application data on the server in batch mode. In this embodiment, all changes made to application data during disconnected operation may be queued on the client system until reconnection, at which time the changes may be batch processed by the application or alternatively by a synchronization service. During batch processing, the changes made during disconnected operation may be integrated into application data on the server.

As previously mentioned, in one embodiment, when downloading a version of the application to the client system, state information for the thin client with the application may be saved. In one embodiment, upon reconnection of the thin client to the application, the saved state information may be used to reestablish and synchronize the state of the thin client with the application. In one embodiment, the downloaded version of the application may maintain and update state information on the client system during disconnected operations. Upon reconnection, the state information on the client system may be compared to saved state information for the thin client on the server to determine any changes that need to be made in state information on the server.

Figure 6:
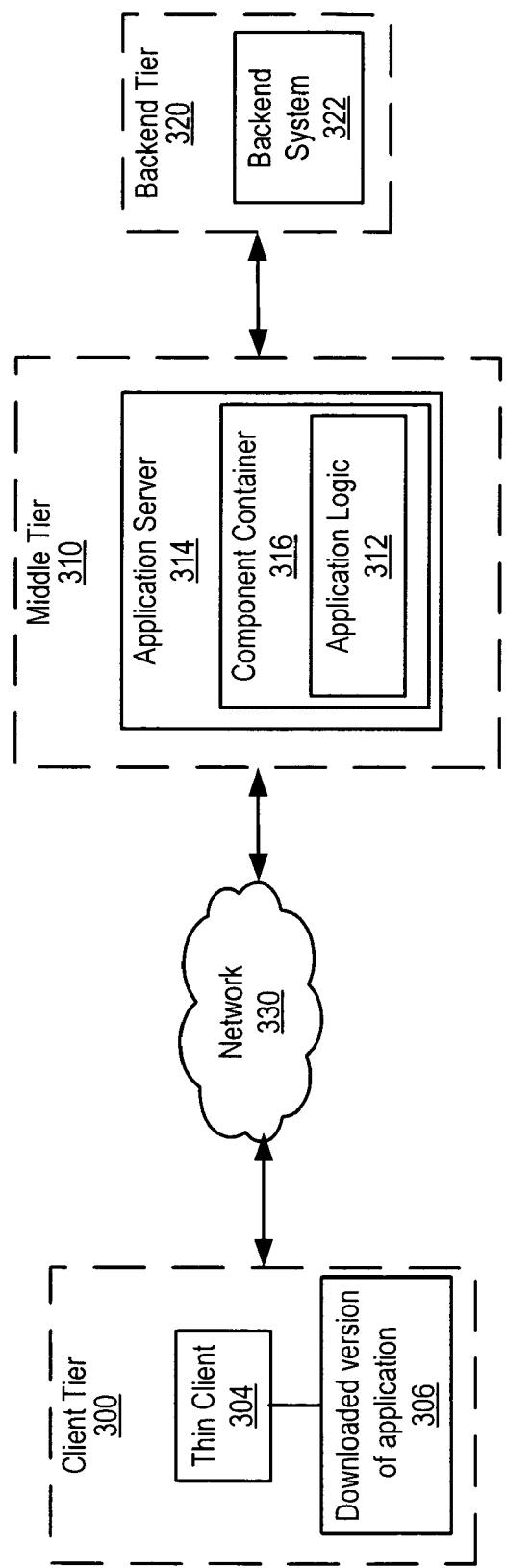
FIG. 6 illustrates disconnected operation in a tiered environment according to one embodiment.

FIG. 6 illustrates disconnected operation in a tiered network environment according to one embodiment. In one embodiment, application 312 may include a plurality of components (e.g., applets, thin clients, servlets, application logic, etc) that may reside on two or more different systems depending on factors such as security, load distribution and function. Two or more tiers (e.g., client tier 300, middle tier 310, and backend tier 320) may represent the logical and/or physical organization of the application across two or more different systems that may be based on different platforms and architectures. In one embodiment as illustrated in FIG. 6, the application may be based on a three-tiered architecture. In other embodiments, the application may be based on a two-tiered or N-tiered architecture.

Middle tier 310 may include one or more application servers 314. One or more of the components operating within the middle tier 310, such as application logic 312, may be configured to run within component container 316 on application server 314. One or more standard services (e.g., security, transaction management, state management, multi-threading) may be built into a platform and provided automatically to the application logic 312 via the container 316 and/or application server 314. Backend tier 320 may include one or more systems such as backend system 322. Components on the tiers may communicate in or between the tiers using mechanisms such as Hyper Text Transfer Protocol Secure sockets (HTTPS), Java™ Database Connectivity (JDBC), eXtensible Markup Language (XML) and/or Simple Object Access Protocol (SOAP), among others. In one embodiment, the application may be implemented with Java™ 2 Platform, Enterprise Edition (J2EE™) from Sun Microsystems, and the application logic 312 in middle tier 310 may be implemented as Enterprise JavaBeans (EJBs).

Client tier 300 may include one or more thin clients 304 which may be configured to connect and communicate with application logic 312 in middle tier 310 via a network 330. Thin client 304 may provide a user interface to the application components on middle tier 310. As an example, thin client 304 may be a Web browser that may access static or dynamic Web pages from middle tier 310. In one embodiment, thin client 304 may not include any application logic of the application. In some embodiments, thin client 304 may include a portion of the application logic of the application.

Thin client 304 may be physically disconnected from network 330 and/or logically disconnected from the application components on middle tier 310 for one of various reasons. As examples, a system including thin client 304 may be manually disconnected from network 330, or the network connection may be scheduled to be taken down for maintenance or other reasons or may go down due to hardware or software failure. Alternatively, thin client 304 may logically disconnect or "log off" from the application.

Prior to disconnection of thin client 304, a version 306 of the application may be downloaded to a client system including thin client 304. Thin client 304 may then access the downloaded version 306 while disconnected. The downloaded version of the application 306 may be configured to provide at least a portion of the functionality of the application to thin client 304 while thin client 304 is disconnected from the application. In one embodiment, thin client 304 may initiate the download. In one embodiment, the download may be initiated by the application logic 312 in middle tier 310. In one embodiment, only the application logic of the application that is necessary or desired during disconnected operation may be downloaded to the client system. In one embodiment, downloading a version of the application may include saving state information for thin client 304 with the application. In one embodiment, required or desired data (e.g. files, database tables, etc.) for disconnected operations may be downloaded to the client system.

In one embodiment, downloaded version of the application 306 may be configured for execution in the client tier 300 in a virtual machine such as a Java Virtual Machine (JVM).

A user of thin client 304 may access downloaded version of the application 306 on the client system to perform one or more functions of the application provided by the downloaded version 306 while thin client 304 is disconnected from the application. In one embodiment, any changes made during disconnected operation may be saved for processing and integration into the application when and if thin client 304 reconnects to the application.

At some point, connection between thin client 304 and the application may be reestablished. After reconnection, any changes made during disconnected operation may be integrated into the application. During disconnected operation, downloaded data may be modified and/or new data may be generated on the client system. In one embodiment, downloaded version of the application 306 may generate scripts, commands or other mechanisms for performing one or more functions of the application (e.g. modifying application data) when and if connection to the application is reestablished.

One embodiment may include a synchronization service, for example in the middle tier of FIG. 6, to which the changed data and/or mechanisms for modifying application data or performing other functions of the application may be provided; the synchronization service may then process and integrate the changes into application data and/or process and perform the tasks specified by the mechanisms (scripts, commands, etc) as necessary. In one embodiment, the application (e.g. application logic 312 in middle tier 310) may directly receive the changed data and/or mechanisms for modifying application data or performing other functions of the application and process and integrate the changed data into the application data and/or process and perform the tasks specified by the mechanisms as necessary.

In one embodiment, changes made to application data during disconnected operation may be integrated into application data in batch mode. In this embodiment, all changes made to application data during disconnected operation may be queued in client tier 300 until reconnection, at which time the changes may be batch processed by the application or a synchronization service. During batch processing, the changes made during disconnected operation may be integrated into application data.

As previously mentioned, in one embodiment, when downloading a version of the application to the client system, state information for the thin client with the application may be saved. In one embodiment, upon reconnection of thin client 304 to the application, the saved state information may be used to reestablish and synchronize the state of the thin client with the application. In one embodiment, downloaded version of the application 306 may maintain and update state information on the client system during disconnected operations. Upon reconnection, the state information on the client system may be compared to saved state information on the server to determine any changes that need to be made in state information on the server.

CONCLUSION

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    a server configured to host an application accessible by one or more clients via a network; and
    a client device comprising a thin client configured to interact with the application via the network to remotely perform one or more functions of the application while a connection exists between the thin client and the application on the server;
    wherein the system is configured to download a version of the appplication to the client device via the network, wherein the downloaded version of the application is configured to provide at least a portion of application logic of the application to the thin client; and
    wherein the thin client is further configured to:
        disconnect from the application on the server; and
        access the downloaded version of the application on the client device to perform one or more functions of the application provided by the at least a portion of the application logic while the thin client is disconnected from the application;
    wherein the application is configured to save a state of the thin client with the application before said disconnection;
    wherein the downloaded version of the application is configured to maintain state information for said access of the downloaded version of the application on the client device;
    wherein the thin client is further configured to reconnect to the application on the server via the network; and
    wherein the application is further configured to update the saved state of the thin client on the server according to the state information for said access of the downloaded version of the application on the client device.

2. The system as recited in claim 1, wherein the client device is further configured to store one or more changes made to application data during said access of the downloaded version of the application.

3. The system as recited in claim 2,
    wherein the thin client is further configured to reconnect to the application on the server via the network; and
    wherein the application on the server is further configured to integrate the one or more changes made to the application data on the client device into application data on the server after said reconnection.

4. The system as recited in claim 2,
    wherein the thin client is further configured to reconnect to the application on the server via the network; and
    wherein the system further comprises a synchronization service configured to integrate the one or more changes made to the application data on the client device into application data on the server.

5. The system as recited in claim 1,
    wherein the client device is further configured to delete the downloaded version of the application after said reconnection.

6. The system as recited in claim 1, wherein said download of the version of the application via the network is initiated by the application.

7. The system as recited in claim 1, wherein said download of the version of the application via the network is initiated by the thin client.

8. The system as recited in claim 1, wherein said download of the version of the application via the network is initiated in response to an indication that a network connection between the thin client and the application is to go down.

9. The system as recited in claim 1, wherein the server is in one tier of a tiered network environment, and wherein the client device is in another tier of the tiered network environment.

10. The system as recited in claim 1, wherein the application is implemented according to Java™ 2 Platform, Enterprise Edition (J2EE™), and wherein the application logic is implemented as Enterprise JavaBeans (EJBs).

11. A system, comprising:
    a processor; and
    a memory storing program instructions executable by the processor to:
        implement a thin client configured to interact with an application on another system via a network to remotely perform one or more functions of the application while a connection exists between the thin client and the application on the other system;
        download a version of the application via the network to the system, wherein the downloaded version of the application is configured to provide at least a portion of application logic of the application to the thin client;
    wherein the thin client is further configured to:
        disconnect from the application; and
        access the downloaded version of the application on the client device to perform one or more functions of the application provided by the at least a portion of the application logic while the thin client is disconnected from the application;
    wherein the application is configured to save a state of the thin client with the application before said disconnection;
    wherein the program instructions are further executable by the processor to maintain state information for said access of the downloaded version of the application on the system;
    wherein the thin client is further configured to reconnect to the application on the other system via the network; and
    wherein the program instructions are further executable by the processor to provide the state information to the application to update the saved state of the thin client on the other system according to the provided state information.

12. The system as recited in claim 11, wherein the program instructions are further executable by the processor to store one or more changes made to application data during said access of the downloaded version of the application.

13. The system as recited in claim 12,
wherein the thin client is further configured to reconnect to the application on other system via the network; and
wherein the program instructions are further executable by the processor to provide the one or more changes made to the application data to the application for integration into application data on the other system after said reconnection.

14. The system as recited in claim 11,
wherein the program instructions are further executable by the processor to delete the downloaded version of the application from the system after said reconnection.

15. The system as recited in claim 11, wherein the application is implemented according to Java™ 2 Platform, Enterprise Edition (J2EE™), and wherein the application logic is implemented as Enterprise JavaBeans (EJBs).

16. A system, comprising:
a processor; and
a memory storing program instructions executable by the processor to:
implement an application configured for access by thin clients via a network for the thin clients to interact with the application to remotely perform one or more functions of the application while a respective connection exists between each thin client and the application;
download a version of the application via the network to a client system comprising a thin client, wherein the downloaded version of the application is configured to provide at least a portion of application logic of the application to the thin client during disconnected operation of the client system;
disconnect from the thin client and save a state of the thin client with the application before said disconnection;
reconnect to the thin client;
wherein state information is maintained on the client system for thin client access of the downloaded version of the application on the client system while disconnected from the application;
update the saved state of the thin client on the system after said reconnection according to the state information provided from the client system for the thin client access of the downloaded version of the application on the client system while disconnected from the application; and
integrate one or more changes made to application data on the client device while disconnected from the application into application data on the system after said reconnection.

17. The system as recited in claim 16, wherein the application is implemented according to Java™ 2 Platform, Enterprise Edition (J2EE™), and wherein the application logic is implemented as Enterprise JavaBeans (EJBs).

18. A system, comprising:
means for interacting with an application on a server to remotely perform one or more functions of the application on the server while a connection exists between a thin client and the application on the server;
means for downloading a version of the application on the server to a device comprising the thin client, wherein the downloaded version of the application is configured to provide at least a portion of application logic of the application to the thin client;
means for accessing the downloaded version of the application on the client device via the thin client to perform one or more functions of the application provided by the at least a portion of the application logic while the thin client is disconnected from the application;
wherein a state of the thin client with the application is saved at the server before said disconnection;
means for maintaining state information for said accessing of the downloaded version of the application on the client device;
means for reconnecting to the application on the server via the network; and
means for updating the saved state of the thin client on the server according to the state information for said accessing of the downloaded version of the application on the client device.

19. The system as recited in claim 18, further comprising means for integrating one or more changes made to application data on the device into application data on the server after the thin client reconnects to the application.

20. A method, comprising:
a thin client on a client device interacting with an application on a server via a network to remotely perform one or more functions of the application while a connection exists between the thin client and the application on the server;
downloading a version of the application to the client device via the network, wherein the downloaded version of the application is configured to provide at least a portion of application logic of the application to the thin client;
the thin client disconnecting from the application on the server and saving a state of the thin client with the application on the server before said disconnection;
the thin client accessing the downloaded version of the application on the client device to perform one or more functions of the application provided by the at least a portion of the application logic while the thin client is disconnected from the application; and
maintaining state information for said accessing of the downloaded version of the application on the client device;
the thin client reconnecting to the application on the server via the network; and
updating the saved state of the thin client with the application on the server according to the state information for said accessing of the downloaded version of the application on the client device.

21. The method as recited in claim 20, further comprising storing one or more changes made to application data during said accessing the downloaded version of the application.

22. The method as recited in claim 21, further comprising:
the thin client reconnecting to the application on the server via the network; and
integrating the one or more changes made to the application data on the client device into application data on the server after said reconnection.

23. The method as recited in claim 21, further comprising:
the thin client reconnecting to the application on the server via the network; and
a synchronization service integrating the one or more changes made to the application data on the client device into application data on the server.

24. The method as recited in claim 20, further comprising: deleting the downloaded version of the application after said reconnection.

25. The method as recited in claim 20, wherein the server is in one tier of a tiered network environment, and wherein the client device is in another tier of the tiered network environment.

26. The method as recited in claim 20, wherein said downloading of the version of the application via the network is initiated by the application.

27. The method as recited in claim 20, wherein said downloading of the version of the application via the network is initiated by the thin client.

28. The method as recited in claim 20, further comprising initiating said downloading of the version of the application via the network in response to an indication that a network connection between the thin client and the application is to go down.

29. The method as recited in claim 20, wherein the application is implemented according to Java™ 2 Platform, Enterprise Edition (J2EE™), and wherein the application logic is implemented as Enterprise JavaBeans (EJBs).

30. A computer-accessible storage medium storing program instructions computer-executable to implement:
downloading a version of an application to a client device via a network, wherein the downloaded version of the application is configured to provide at least a portion of application logic of the application to a thin client of the application on the client device, wherein said downloading is performed subsequent to the thin client interacting with the application on a server via the network to remotely perform one or more functions of the application while a connection exists between the thin client and the application on the server;
the thin client disconnecting from the application on the server and saving a state of the thin client with the application on the server before said disconnection;
the thin client accessing the downloaded version of the application on the client device to perform one or more functions of the application provided by the at least a portion of the application logic while the thin client is disconnected from the application;
maintaining state information for said accessing of the downloaded version of the application on the client device;
the thin client reconnecting to the application on the server via the network; and
updating the saved state of the thin client with the application on the server according to the state information for said accessing of the downloaded version of the application on the client device.

31. The computer-accessible medium as recited in claim 30, wherein the program instructions are further configured to implement storing one or more changes made to application data during said accessing the downloaded version of the application.

32. The computer-accessible medium as recited in claim 31, wherein the program instructions are further configured to implement:
the thin client reconnecting to the application on the server via the network; and
integrating the one or more changes made to the application data on the client device into application data on the server after said reconnection.

33. The computer-accessible medium as recited in claim 31, wherein the program instructions are further configured to implement:
the thin client reconnecting to the application on the server via the network; and
a synchronization service integrating the one or more changes made to the application data on the client device into application data on the server.

34. The computer-accessible medium as recited in claim 30, wherein the program instructions are further configured to implement:
deleting the downloaded version of the application after said reconnection.

35. The computer-accessible medium as recited in claim 30, wherein the program instructions are further configured to implement initiating said downloading of the version of the application via the network in response to an indication that a network connection between the thin client and the application is to go down.

36. The computer-accessible medium as recited in claim 30, wherein the application is implemented according to Java™ 2 Platform, Enterprise Edition (J2EE™), and wherein the application logic is implemented as Enterprise JavaBeans (EJBs).

37. A system, comprising:
a server configured to host an application accessible by one or more clients via a network; and
a client device comprising a thin client configured to:
interact with the application via the network to remotely perform one or more functions of the application while a connection exists between the thin client and the application on the server; and
request a download of a version of the application to the client device via the network, wherein the version of the application is configured to provide at least a portion of application logic of the application to the thin client during disconnected operation of the client system;
wherein the server is further configured to:
determine if the thin client has access to the at least a portion of the application logic provided by the requested version of the application; and
if the thin client has access to the at least a portion of the application logic provided by the requested version of the application, download the version of the application to the client device via the network;
wherein the thin client is further configured to:
disconnect from the application on the server; and
if the thin client has access to the at least a portion of the application logic provided by the requested version of the application, access the downloaded version of the application on the client device to perform one or more functions of the application provided by the at least a portion of the application logic while the thin client is disconnected from the application;
wherein the client device is further configured to store one or more changes made to application data during said access of the downloaded version of the application;
reconnect to the application on the server via the network; and
wherein the application is further configured to integrate the one or more changes made to the application data on the client device into application data on the server after said reconnection.

* * * * *